(12) United States Patent
Kawaguchi

(10) Patent No.: US 8,208,035 B2
(45) Date of Patent: Jun. 26, 2012

(54) IMAGE SENSING APPARATUS, IMAGE CAPTURING METHOD, AND PROGRAM RELATED TO FACE DETECTION

(75) Inventor: Zenya Kawaguchi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 309 days.

(21) Appl. No.: 12/510,873

(22) Filed: Jul. 28, 2009

(65) Prior Publication Data

US 2010/0033590 A1 Feb. 11, 2010

(30) Foreign Application Priority Data

Aug. 7, 2008 (JP) ................................ 2008-204769
Jun. 3, 2009 (JP) ................................ 2009-134301

(51) Int. Cl.
*H04N 5/228* (2006.01)
*H04N 5/222* (2006.01)
*G06K 9/46* (2006.01)
*G06K 9/66* (2006.01)

(52) U.S. Cl. ................. 348/222.1; 348/333.04; 382/190

(58) Field of Classification Search .................. 348/239, 348/222.1, 333.03, 333.04; 396/51, 153; 382/190
See application file for complete search history.

(56) References Cited

U.S. PATENT DOCUMENTS

| 5,982,912 | A | 11/1999 | Fukui et al. | |
|---|---|---|---|---|
| 6,996,340 | B2 * | 2/2006 | Yamaguchi et al. | 396/263 |
| 7,248,300 | B1 | 7/2007 | Ono | |
| 7,652,695 | B2 * | 1/2010 | Halpern | 348/239 |
| 7,986,346 | B2 * | 7/2011 | Kaneda et al. | 348/222.1 |
| 8,045,013 | B2 * | 10/2011 | Abe | 348/222.1 |
| 8,077,215 | B2 * | 12/2011 | Nakamura | 348/222.1 |
| 8,089,523 | B2 * | 1/2012 | Miyata | 348/222.1 |
| 8,130,281 | B2 * | 3/2012 | Kaneda et al. | 348/222.1 |
| 2008/0285791 | A1 * | 11/2008 | Suzuki et al. | 382/100 |
| 2009/0066803 | A1 * | 3/2009 | Miyata | 348/222.1 |
| 2009/0219405 | A1 * | 9/2009 | Kaneda et al. | 348/222.1 |
| 2009/0231457 | A1 * | 9/2009 | Lee et al. | 348/222.1 |
| 2009/0324098 | A1 * | 12/2009 | Nilsson | 382/209 |
| 2010/0033591 | A1 * | 2/2010 | Kawaguchi | 348/222.1 |

(Continued)

FOREIGN PATENT DOCUMENTS

JP 06-032154 2/1994

(Continued)

OTHER PUBLICATIONS

"Face Recognition Using Eigenfaces" Proc. of IEEE Conf. on Computer Vision and Pattern Recognition, pp. 586-591, 1991, Matthew A. Turk and Alex P. Pentland.

*Primary Examiner* — John Villecco
(74) *Attorney, Agent, or Firm* — Cowan, Liebowitz & Latman, P.C.

(57) ABSTRACT

An image sensing apparatus comprises an image sensing unit configured to sense an object and generate image data, a face detection unit configured to detect a face region of a person contained in the image data generated by the image sensing unit, and a facial expression determination unit configured to determine a plurality of facial expressions in the face region determined by the face detection unit. When both a first facial expression and a second facial expression are determined, the facial expression determination unit corrects a condition to determine the second facial expression so as to become difficult as compared to the determination condition when the first facial expression is not determined and the second facial expression is determined.

9 Claims, 6 Drawing Sheets

U.S. PATENT DOCUMENTS

| | | | |
|---|---|---|---|
| 2010/0315521 A1* | 12/2010 | Kunishige et al. | 348/220.1 |
| 2011/0032378 A1* | 2/2011 | Kaneda | 348/222.1 |
| 2011/0228129 A1* | 9/2011 | Miyata | 348/222.1 |
| 2011/0261219 A1* | 10/2011 | Suzuki et al. | 348/222.1 |
| 2011/0279700 A1* | 11/2011 | Steinberg et al. | 348/222.1 |

FOREIGN PATENT DOCUMENTS

| | | |
|---|---|---|
| JP | 09-251534 | 9/1997 |
| JP | 2000-347277 | 12/2000 |
| JP | 2004-294498 | 10/2004 |
| JP | 2007-049631 | 2/2007 |

* cited by examiner

IMAGE SENSING APPARATUS, IMAGE CAPTURING METHOD, AND PROGRAM RELATED TO FACE DETECTION

BACKGROUND OF THE INVENTION

1. Field of the Invention

The present invention relates to a technique of determining the facial expression of an object to capture an image.

2. Description of the Related Art

When photographing a person with an image sensing apparatus such as a digital still camera, it is desired to sense an image which satisfies the object person, such as an image when he smiles or does not close his eyes.

There has conventionally been known a technique of determining whether a captured image is preferable, and recording it in accordance with the determination result.

For example, Japanese Patent Laid-Open No. 2000-347277 discloses a technique of detecting a change of object's eyes, including blinking and a change of the line of sight, and when a predetermined capturing condition is met, capturing an image.

According to a technique disclosed in Japanese Patent Laid-Open No. 2004-294498, when an object makes a desired facial expression or pose, a camera automatically determines the timing as a photo opportunity and captures an image.

Japanese Patent Laid-Open No. 2007-049631 discloses a technique of determining whether the object closes his eyes when the user presses the shutter button of a camera, and if the object closes his eyes, issuing a warning without capturing an image.

However, an error may occur when the camera simultaneously uses, for example, a function of automatically capturing an image when it is determined that a person smiles, and a function of inhibiting image capturing when he closes his eyes. More specifically, the eyes of a person generally narrow when he smiles, and even a smile is highly likely determined to be eye closure. When this occurs, the user may miss an opportunity to photograph a smiling object.

Japanese Patent Laid-Open Nos. 2000-347277 and 2004-294498 do not consider a case in which a plurality of facial expressions are simultaneously determined as described above.

SUMMARY OF THE INVENTION

The present invention has been made to overcome the conventional problems, and has as its object to provide a technique capable of reducing a determination error when simultaneously determining a plurality of facial expressions, and reliably capturing an image at a desired photo opportunity.

In order to solve the aforementioned problems, the present invention provides an image sensing apparatus comprising: an image sensing unit configured to sense an object and generate image data; a face detection unit configured to detect a face region of a person contained in the image data generated by the image sensing unit; and a facial expression determination unit configured to determine a plurality of facial expressions in the face region determined by the face detection unit, wherein when both a first facial expression and a second facial expression are determined, the facial expression determination unit corrects a condition to determine the second facial expression so as to become difficult as compared to the determination condition when the first facial expression is not determined and the second facial expression is determined.

The present invention also provides an image sensing apparatus comprising: an image sensing unit configured to sense an object and generate image data; a face detection unit configured to detect a face region of a person contained in the image data generated by the image sensing unit; and a facial expression determination unit configured to determine a plurality of facial expressions in the face region determined by the face detection unit, wherein when the first facial expression is determined, the facial expression determination unit does not determine the second facial expression.

The present invention also provides an image capturing method in an image sensing apparatus which senses an object to generate image data, the method comprising: a face detection step of detecting a face region of a person contained in the generated image data; a facial expression determination step of determining a plurality of facial expressions in the face region determined in the face detection step; and a control step of controlling image capturing in accordance with a result of the determination in the facial expression determination step, wherein when both a first facial expression and a second facial expression are determined in the facial expression determination step, a condition to determine the second facial expression is corrected so as to become difficult as compared to the determination condition when the first facial expression is not determined and the second facial expression is determined.

The present invention also provides an image capturing method in an image sensing apparatus which senses an object to generate image data, the method comprising: a face detection step of detecting a face region of a person contained in the generated image data; a facial expression determination step of determining a plurality of facial expressions in the face region determined in the face detection step; and a control step of controlling image capturing in accordance with a result of the determination in the facial expression determination step, wherein when the first facial expression is determined in the facial expression determination step, the second facial expression is not determined.

According to the present invention, when simultaneously determining a plurality of facial expressions, a determination error can be reduced to reliably capture an image at a desired photo opportunity.

Further features of the present invention will become apparent from the following description of exemplary embodiments with reference to the attached drawings.

DESCRIPTION OF THE EMBODIMENTS

Preferred embodiments of the present invention will be described in detail below with reference to the accompanying drawings.

The following embodiments are merely examples for practicing the present invention. The embodiments should be properly modified or changed depending on various conditions and the structure of an apparatus to which the present invention is applied. The present invention is not limited to the following embodiments.

First Embodiment

Figure 1:
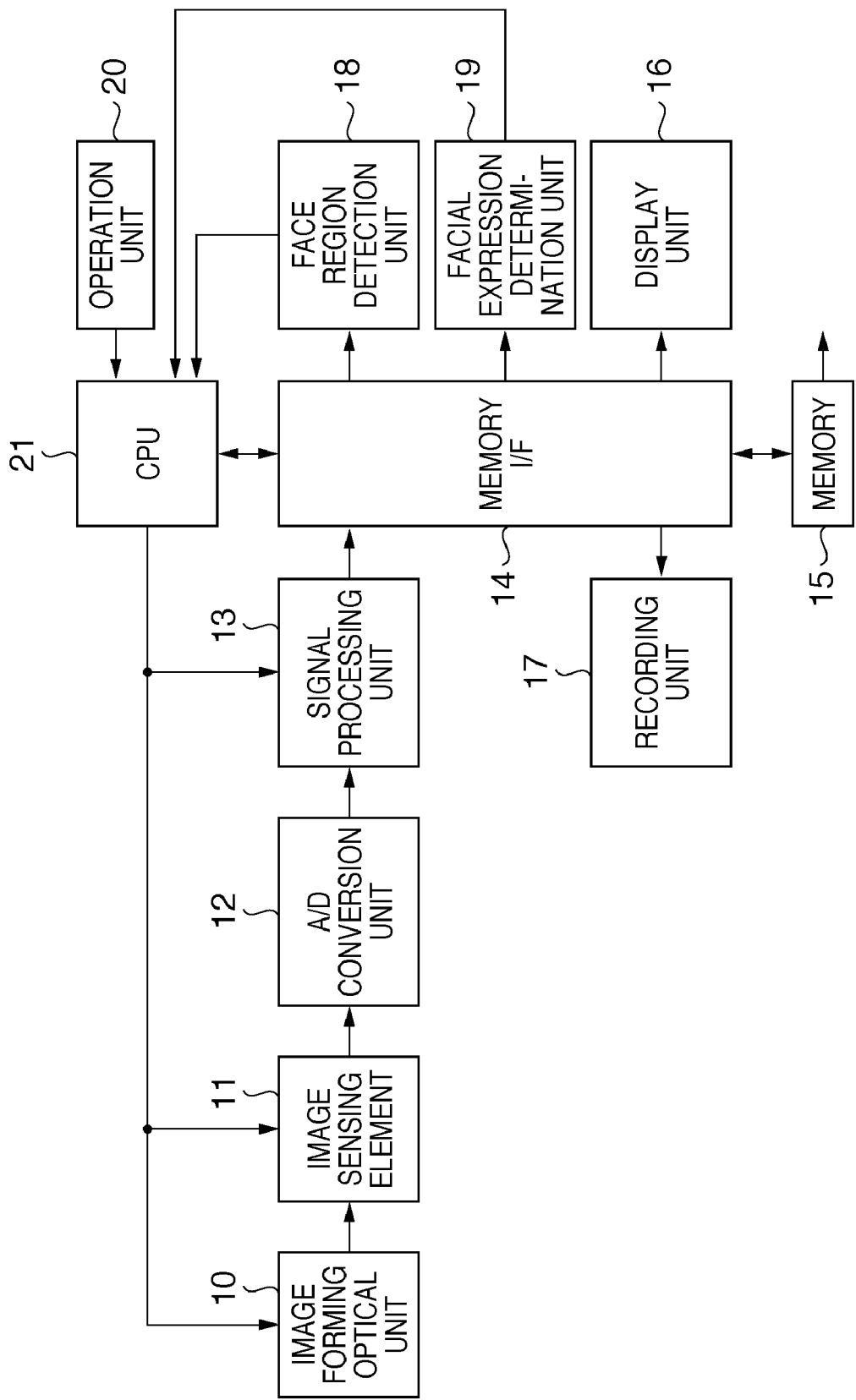
FIG. 1 is a block diagram of an image sensing apparatus in the first embodiment.

FIG. 1 is a block diagram showing the schematic arrangement of an image sensing apparatus according to the first embodiment of the present invention.

Referring to FIG. 1, an image forming optical unit 10 includes a lens and stop, and adjusts the focus and exposure. An image sensing element 11 such as a CCD sensor or CMOS sensor converts an optical image into an electrical signal. An A/D conversion unit 12 converts an analog image signal output from the image sensing element 11 into a digital image signal. A signal processing unit 13 performs gamma processing, interpolation processing, matrix transformation, and the like for an output signal from the A/D conversion unit 12, generating an image signal. A memory 15 such as a DRAM can temporarily store an image signal and the like.

A memory I/F 14 writes and reads out image signals and various control signals in and from the memory 15. A display unit 16 displays image data on an LCD panel or the like. A recording unit 17 compresses image data and records it on a recording medium such as a memory card. A face region detection unit 18 detects a face region from an image signal. A facial expression determination unit 19 determines a smile or eye closure in an image signal. An operation unit 20 includes a shutter switch, and a four-way selector key associated with a user operation (to be described later). A CPU 21 executes various control operations, and decides the facial expression determination mode of the image sensing apparatus based on a user operation to the operation unit 20.

The operation of each block in FIG. 1 will be explained with reference to the flowchart of FIG. 2.

The image sensing apparatus controls the display unit 16 to display an image generated from an image signal from the image sensing element 11 so that the user can monitor an image to be captured. In the embodiment, the position of a face region and the facial expression are determined while the user can monitor an image on the display unit 16.

Figure 2:
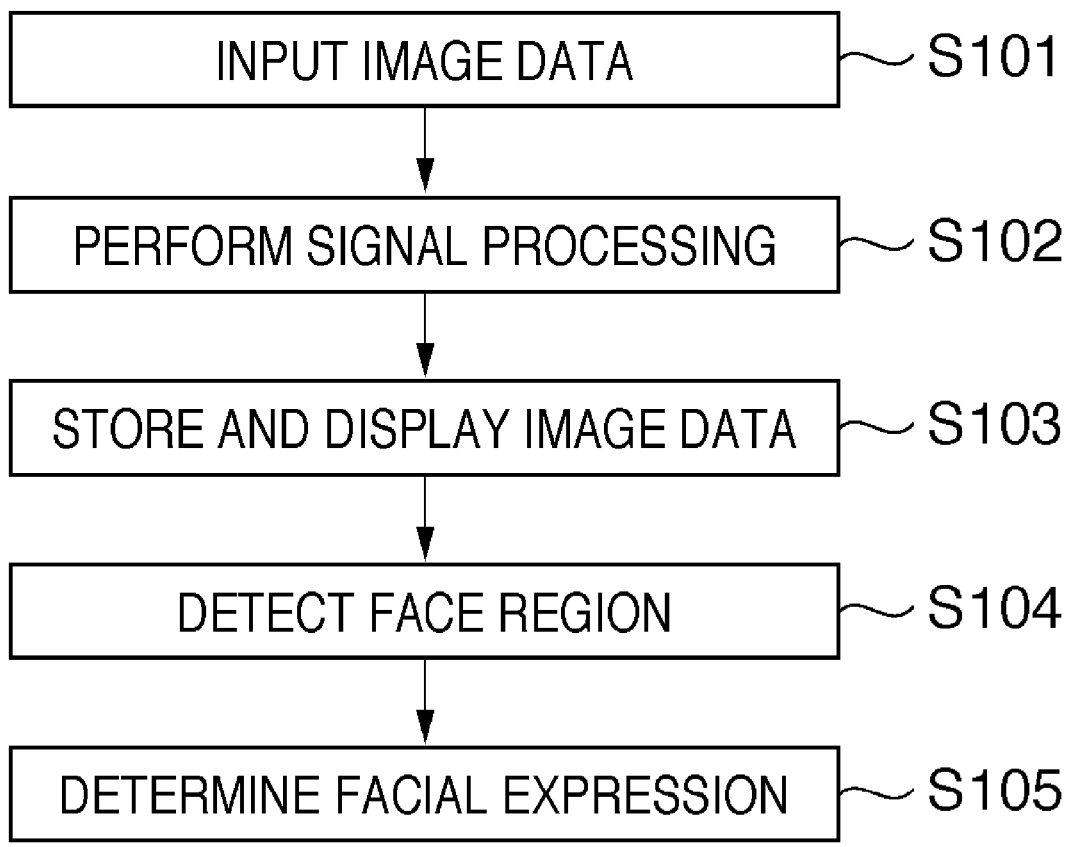
FIG. 2 is a flowchart showing the operation of the image sensing apparatus in the first embodiment.

In step S101 of FIG. 2, a light beam entering the image forming optical unit 10 forms an image on the light receiving surface of the image sensing element 11, outputting the image as an analog image signal from the image sensing element 11. The A/D conversion unit 12 converts the analog image signal into a digital image signal, and outputs the digital image signal to the signal processing unit 13.

In step S102, the signal processing unit 13 performs gamma processing, interpolation processing, matrix transformation, and the like for the received image signal, generating an image signal.

In step S103, the memory 15 stores, via the memory I/F 14, the image signal generated in step S102. A display image signal stored in the memory 15 is read out via the memory I/F 14, and displayed on the display unit 16.

In step S104, the face region detection unit 18 detects a face region using the image signal stored in the memory 15.

An example of the face detection method uses an eigenface obtained by principal component analysis (M. A. TURK AND A. P. PENTLAND, "FACE RECOGNITION USING EIGENFACES", PROC. OF IEEE CONF. ON COMPUTER VISION AND PATTERN RECOGNITION, PP. 586-591, 1991).

Another method uses feature points such as the eyes, nose, and mouth, as disclosed in Japanese Patent Laid-Open No. 09-251534. According to these methods, whether an input image signal exhibits a face region is determined by pattern matching between an input image signal and a plurality of normal patterns.

In the embodiment, the face region detection unit 18 executes pattern matching between an image signal and the normal pattern of a face region that is stored in the memory 15 in advance. Note that face detection in the embodiment employs a detection method based on pattern matching. However, the detection method is not limited to this, and a variety of known detection methods are available.

As will be described later, the memory 15 stores a plurality of image signal resolutions in accordance with facial expression determination modes of the image sensing apparatus. A higher resolution widens the search range of pattern matching, prolonging the processing time taken for face detection. To prevent this, in step S104, the image signal read out from the memory 15 via the memory I/F 14 is converted into a predetermined resolution, and then the face region detection unit 18 detects a face region.

In step S105, the facial expression determination unit 19 determines a facial expression such as a smile or eye closure in the region determined by the face region detection unit 18 to represent a person's face. The processing time taken for facial expression determination can be shortened by executing it in only a region determined to represent a person's face.

As the smile determination method, a method disclosed in Japanese Patent Laid-Open No. 2004-294498 is applicable. According to this method, the shapes of a face contour, eyes, mouth, and the like are extracted. Whether the person smiles is determined by pattern matching between the relative positions and shapes of them and standardized shapes.

In general, when the person smiles, the two corners of his mouth move up and his eyes narrow. Hence, for example, upon detecting by pattern matching that the two corners of the mouth move up and the opening/closing degree of eyes is equal to or lower than a threshold, the facial expression determination unit 19 can determine that the facial expression is a smile. The opening/closing degree of eyes is higher as the eyes open wider.

As the eye closure determination method, a method disclosed in Japanese Patent Laid-Open No. 06-032154 is available. According to this method, eyes are extracted from a black region within the contour of a face. Whether the eyes are open or closed is determined based on the maximum number of black pixels which are successive regions in the extracted eye region.

The maximum number of black pixels serving as successive regions is 0 when the eyes are completely closed, and a positive value when they are open. As the opening/closing degree of eyes, the facial expression determination unit 19 adopts the maximum number of black pixels which are successive regions. When the maximum number of black pixels is equal to or smaller than a threshold, the facial expression determination unit 19 can determine that the eyes are closed.

According to this smile determination method, when the opening/closing degree of eyes is equal to or lower than a given threshold, it is determined that the facial expression is a smile. In this case, the facial expression may be determined not only as a smile but also as eye closure.

In the present invention, facial expressions to be determined are not restricted to a smile and eye closure, and the facial expressions of joy and anger may also be determined. The facial expression determination method is not limited to the above-mentioned ones, and various known methods are usable.

A facial expression determination mode setting method when determining a plurality of facial expressions of an object and automatically capturing an image will be explained with reference to the flowchart of FIG. 3. The embodiment prepares two facial expression determination modes, that is, a smile determination mode and eye closure determination mode. In the smile determination mode according to the embodiment, when the user presses the shutter switch to designate image capturing, image capturing waits until it is determined that a person smiles. Upon detecting a smile, an image is captured. In the eye closure determination mode, when the user presses the shutter switch to designate image capturing, image capturing is inhibited while it is determined that a person closes his eyes. Upon detecting that the person opens his eyes, an image is captured. In a default setting, neither the smile determination mode nor eye closure determination mode are set in the image sensing apparatus. The user can operate the operation unit 20 to arbitrarily set each facial expression determination mode ON/OFF.

Figure 3:
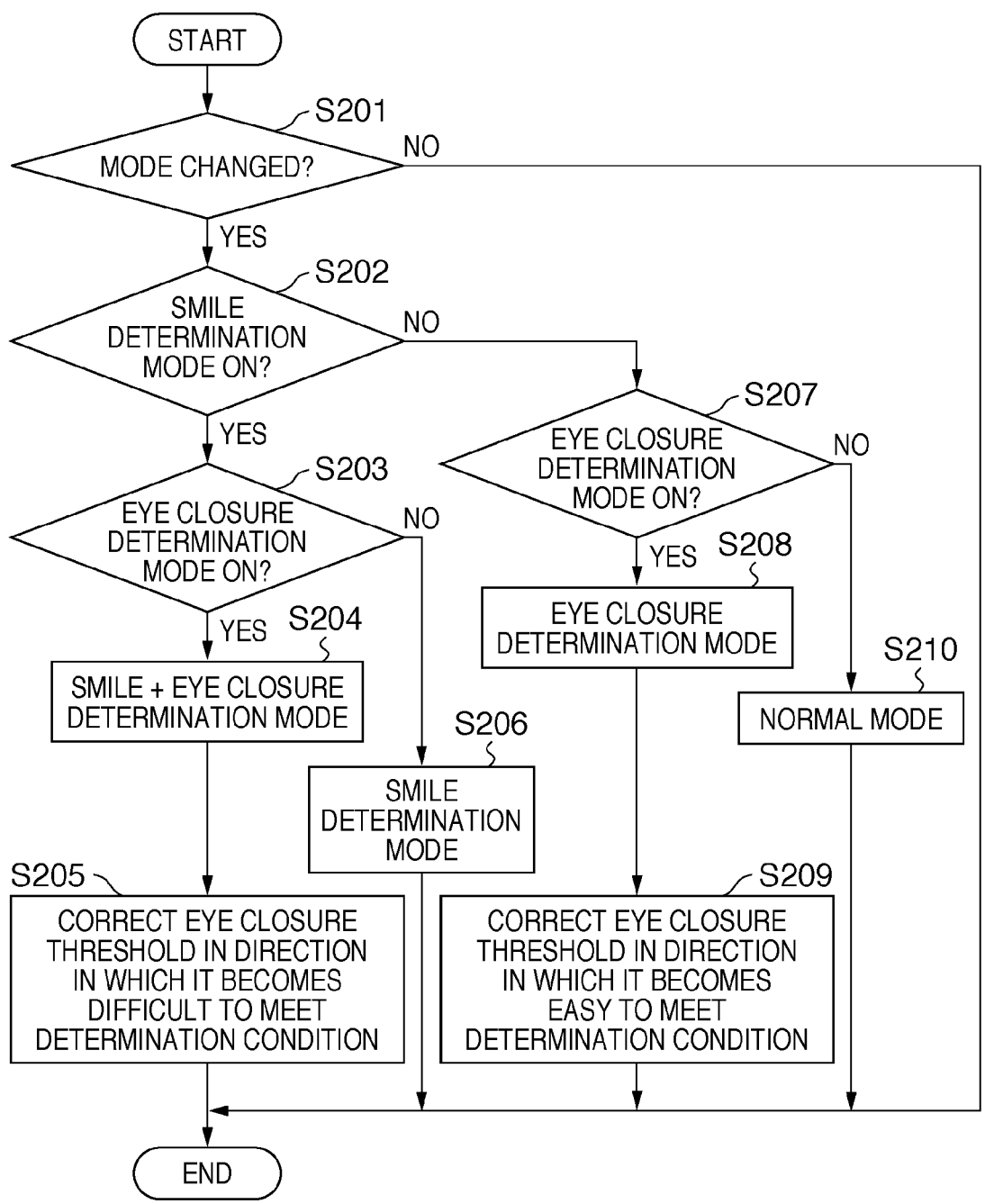
FIG. 3 is a flowchart showing a facial expression determination mode setting method in the first embodiment.

In step S201 of FIG. 3, the CPU 21 detects the state of the operation unit 20 to determine whether the user has pressed the four-way selector key or the like to change the facial expression determination mode. If the user has changed the facial expression determination mode (YES in step S201), the CPU 21 determines in step S202 whether the user has set the smile determination mode ON.

If the user has set the smile determination mode ON (YES in step S202), the CPU 21 determines in step S203 whether the user has set the eye closure determination mode ON.

If the user has set the eye closure determination mode ON (YES in step S203), the CPU 21 sets the "smile+eye closure determination mode" as the facial expression determination mode of the image sensing apparatus in step S204.

In the "smile+eye closure determination mode" in which both a smile and eye closure are determined, a threshold serving as a condition to determine eye closure is corrected in step S205 in a direction in which the threshold makes it more difficult to meet the determination condition than a threshold in the "eye closure determination mode" in which only eye closure is determined.

According to the eye closure determination method, the facial expression determination unit 19 determines whether the opening/closing degree of eyes is equal to or lower than a given threshold. In the "smile+eye closure determination mode", the threshold of the opening/closing degree of eyes is set lower than that in the "eye closure determination mode". The facial expression determination unit 19 sets the threshold of the opening/closing degree of eyes to determine eye closure to be much lower than that of the opening/closing degree of eyes to determine a smile. This prevents determining a smile with narrow eyes as eye closure.

If the user has not set the eye closure determination mode ON (NO in step S203), the CPU 21 sets the "smile determination mode" as the facial expression determination mode of the image sensing apparatus in step S206.

If the user has not set the smile determination mode ON (NO in step S202), the CPU 21 determines in step S207 whether the user has set the eye closure determination mode ON. If the user has set the eye closure determination mode ON (YES in step S207), the CPU 21 sets the "eye closure determination mode" as the facial expression determination mode of the image sensing apparatus in step S208.

In step S209, the threshold to determine eye closure is corrected in a direction in which the threshold makes it easier to meet the determination condition than a threshold set in step S205. That is, the threshold returns to one in the "eye closure determination mode" in which only eye closure is determined.

If the user has not set the eye closure determination mode ON (NO in step S207), the CPU 21 sets a "normal mode" as the facial expression determination mode of the image sensing apparatus in step S210.

In the "normal mode", immediately when the user presses the shutter switch, a still image is captured regardless of the facial expression of an object.

The operation of the image sensing apparatus when the user presses the shutter switch will be explained with reference to the flowchart of FIG. 4. After detecting that the user has pressed the shutter switch of the operation unit 20, the CPU 21 starts the sequence in FIG. 4.

In step S301, the CPU 21 determines whether either the smile determination mode or eye closure determination mode is ON. If either mode is ON, the CPU 21 advances to step S302. If neither the smile determination mode nor eye closure determination mode are ON, the CPU 21 advances to step S309 to capture a still image. In step S302, the CPU 21 reads a new image signal that has been generated by the image sensing element 11 and converted into a digital image signal by the A/D conversion unit 12.

In step S303, the CPU 21 determines whether the smile determination mode is ON. If the smile determination mode is ON, the CPU 21 advances to step S304. If the smile determination mode is not ON, the CPU 21 advances to step S307 to perform eye closure determination.

In step S304, the CPU 21 causes the face region detection unit 18 and facial expression determination unit 19 to determine whether the image signal read in step S302 represents a person's face and whether the person smiles.

If a smile is detected in the image signal in step S305, the CPU 21 advances to step S306. If no smile is detected, the CPU 21 returns again to step S302 to read a new image signal.

In step S306, the CPU 21 determines whether the eye closure determination mode is ON. If the eye closure determination mode is ON, the CPU 21 advances to step S307. If the eye closure determination mode is not ON, the CPU 21 advances to step S309 to capture a still image.

In step S307, the CPU 21 causes the face region detection unit 18 and facial expression determination unit 19 to determine whether the image signal read in step S302 represents a person's face and whether the person closes his eyes. At this time, a threshold determined in the flowchart of FIG. 3 is reflected, and a threshold to determine eye closure is changed depending on whether the smile determination mode is ON.

If a smile is detected in the image signal in step S308, the CPU 21 advances to step S309. If no smile is detected, the CPU 21 returns again to step S302 to read a new image signal.

In step S309, the CPU 21 reads a new image signal that has been generated by the image sensing element 11 and converted into a digital image signal by the A/D conversion unit 12. Then, the CPU 21 causes the signal processing unit 13 to execute necessary processing. The CPU 21 causes the recording unit 17 to record the image signal as a generated still image on a recording medium.

In this manner, if neither the smile determination mode nor eye closure determination mode are ON, the CPU 21 captures a still image regardless of the facial expression of an object immediately after the user presses the shutter button of the operation unit 20. If the eye closure determination mode is not ON but the smile determination mode is ON, the CPU 21 captures a still image upon detecting that the person smiles. If the smile determination mode is not ON but the eye closure determination mode is ON, the CPU 21 captures a still image upon detecting that the person opens his eyes. If both the smile determination mode and eye closure determination mode are ON, the CPU 21 captures a still image upon detecting that the person smiles without closing his eyes.

According to the embodiment, in the "smile+eye closure determination mode" in which both a smile and eye closure are determined, a threshold to determine eye closure is corrected in a direction in which the threshold makes it more difficult to meet the determination condition than a threshold in the "eye closure determination mode" in which only eye closure is determined. This decreases the possibility of erroneously determining that a smiling object with narrow eyes closes his eyes. An image of a smile can be reliably captured at a desired photo opportunity.

Second Embodiment

The second embodiment will describe a case in which the eye closure determination mode is set OFF when the smile determination mode is ON.

Figure 5:
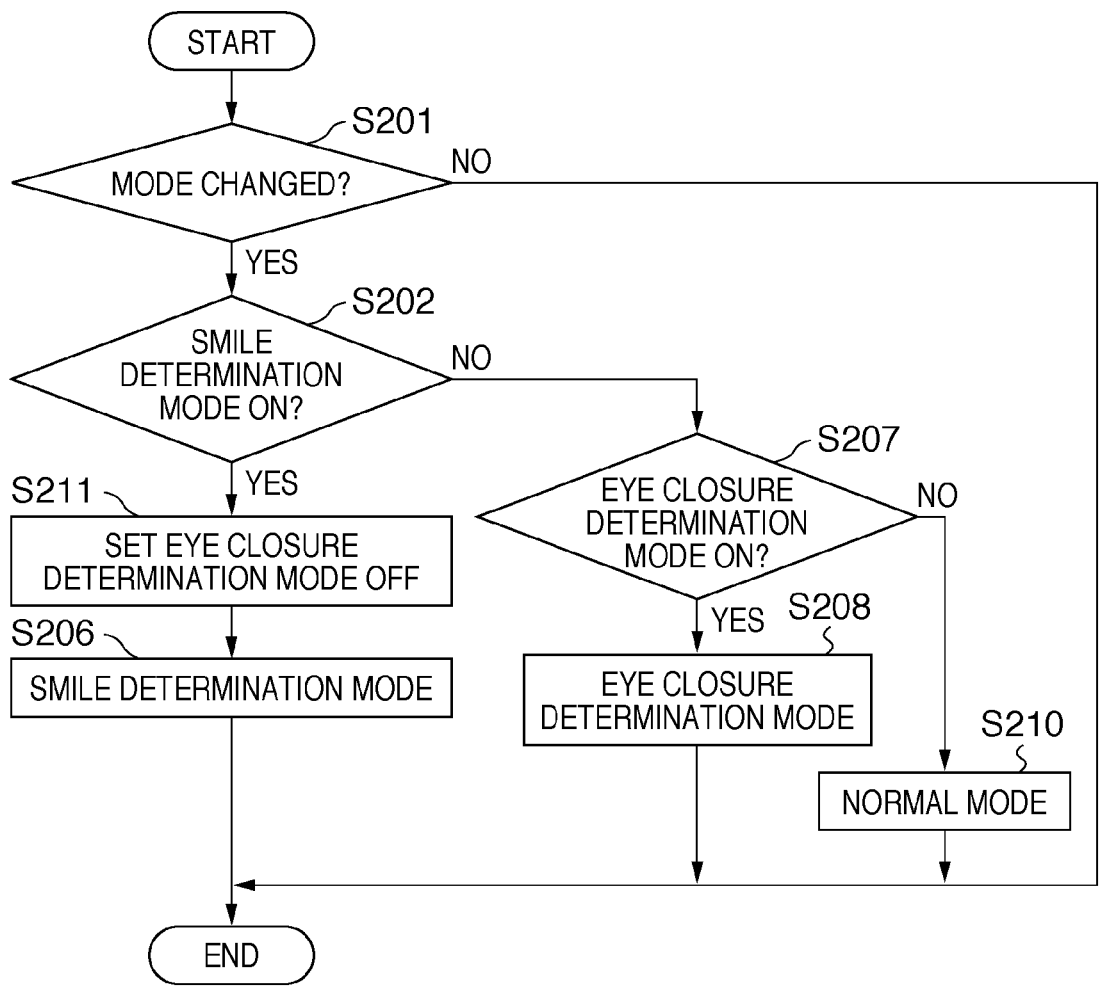
FIG. 5 is a flowchart showing a facial expression determination mode setting method in the second embodiment.

FIG. 5 is a flowchart showing a facial expression determination mode setting method in an image sensing apparatus according to the second embodiment. The same step numbers as those in FIG. 2 denote the same processes, and a description thereof will not be repeated.

In FIG. 5, if the smile determination mode is ON (YES in step S202), a CPU 21 sets the eye closure determination mode OFF in step S211, and sets the "smile determination mode" as the facial expression determination mode of the image sensing apparatus (step S206).

The second embodiment sets the "eye closure determination mode" OFF when the "smile determination mode" is ON. This can prevent determining that a smiling object with narrow eyes closes his eyes. An image of a smile can be reliably captured at a desired photo opportunity.

Third Embodiment

The third embodiment will describe a case in which eye closure determination is made after capturing a still image, and if it is determined from the captured still image that the object closes his eyes, displaying a warning message on a display unit 16 to notify the user that eye closure has been determined.

Figure 6:
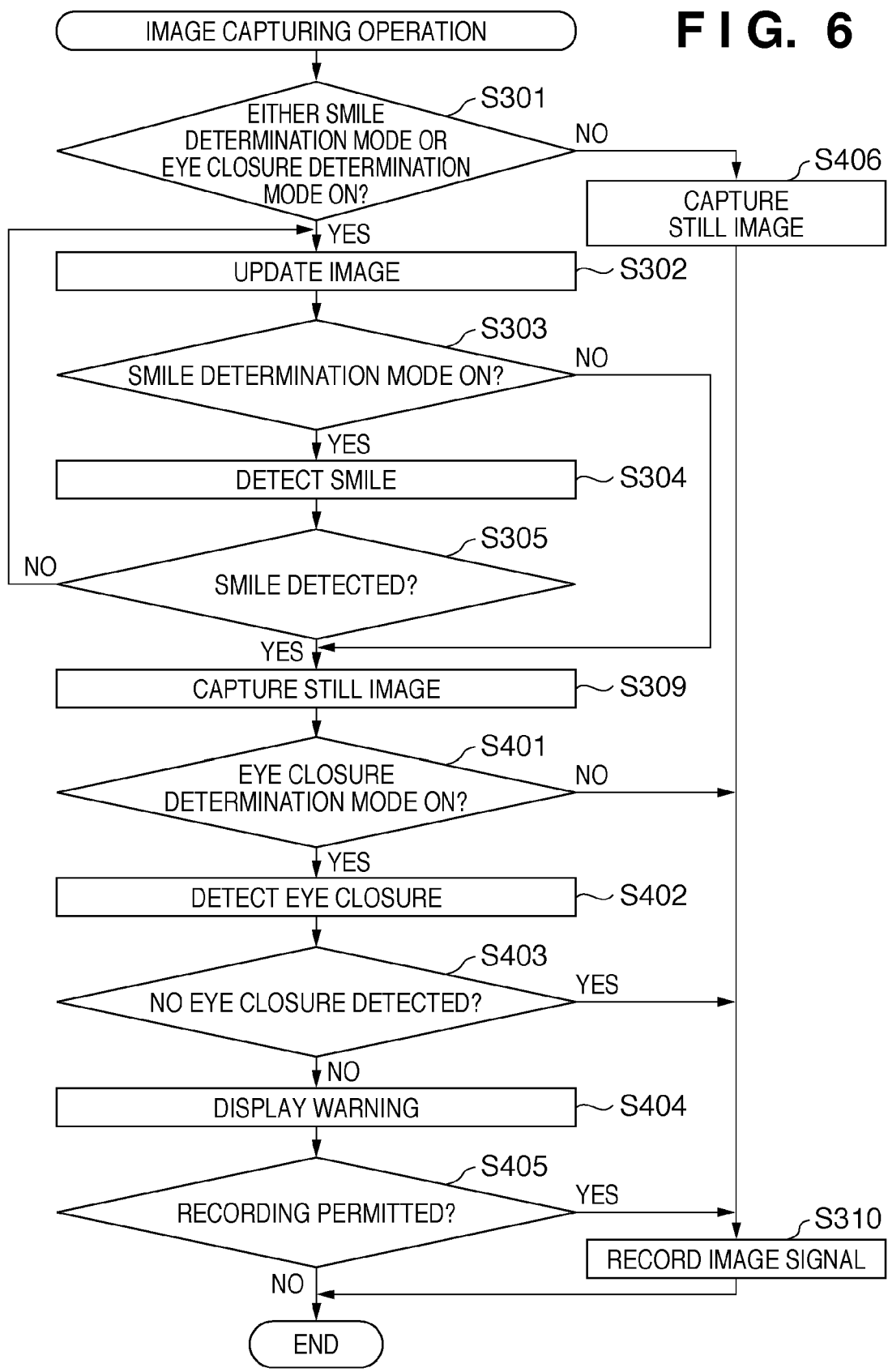
FIG. 6 is a flowchart showing the operation of an image sensing apparatus when the user presses a shutter switch in the third embodiment.

FIG. 6 is a flowchart showing the operation of an image sensing apparatus when the user presses a shutter switch according to the third embodiment. The same step numbers as those in FIG. 4 denote the same processes, and a description thereof will not be repeated.

In FIG. 6, if either the smile determination mode or eye closure determination mode is ON (YES in step S301), a CPU 21 advances to step S302. If neither the smile determination mode nor eye closure determination mode are ON (NO in step S301), the CPU 21 advances to step S406 to capture a still image. Then, the CPU 21 advances to step S310 to cause a recording unit 17 to record an image signal as the still image on a recording medium. If a smile is detected in the image signal in step S305 (YES in step S305), the CPU 21 captures a still image in step S309. If no smile is detected, the CPU 21 returns again to step S302 to read a new image signal.

In step S401, the CPU 21 determines whether the eye closure determination mode is ON. If the eye closure determination mode is ON (YES in step S401), the CPU 21 advances to step S402. In step S402, the CPU 21 executes face region detection (step S104) and facial expression determination (step S105) for the captured still image according to the sequence in FIG. 2. In step S403, the CPU 21 determines whether the object closes his eyes. If the CPU 21 determines that the object closes his eyes (NO in step S403), it advances to step S404 to display a warning message on the display unit 16 to notify the user that eye closure has been determined. In step S405, in addition to the display of the warning message, the CPU 21 presents a display which prompts the user to select whether to erase a captured still image. If the user designates erase of the captured image by operating an operation unit 20 (NO in step S405), the CPU 21 ends the sequence without causing the recording unit 17 to record the captured still image on the recording medium. If the user permits recording of the captured image (YES in step S405), the CPU 21 advances to step S310 to cause the recording unit 17 to record an image signal as the still image on the recording medium.

If the eye closure determination mode is OFF in step S401 (NO in step S401) or the CPU 21 determines in step S403 that the object opens his eyes (YES in step S403), the CPU 21 advances to step S310. In step S310, the CPU 21 causes the recording unit 17 to record an image signal as the still image captured in step S309 on the recording medium.

The third embodiment makes eye closure determination after capturing a still image. Even when the object smiles and narrows his eyes, the user does not miss an opportunity to photograph a smile.

Figure 4:
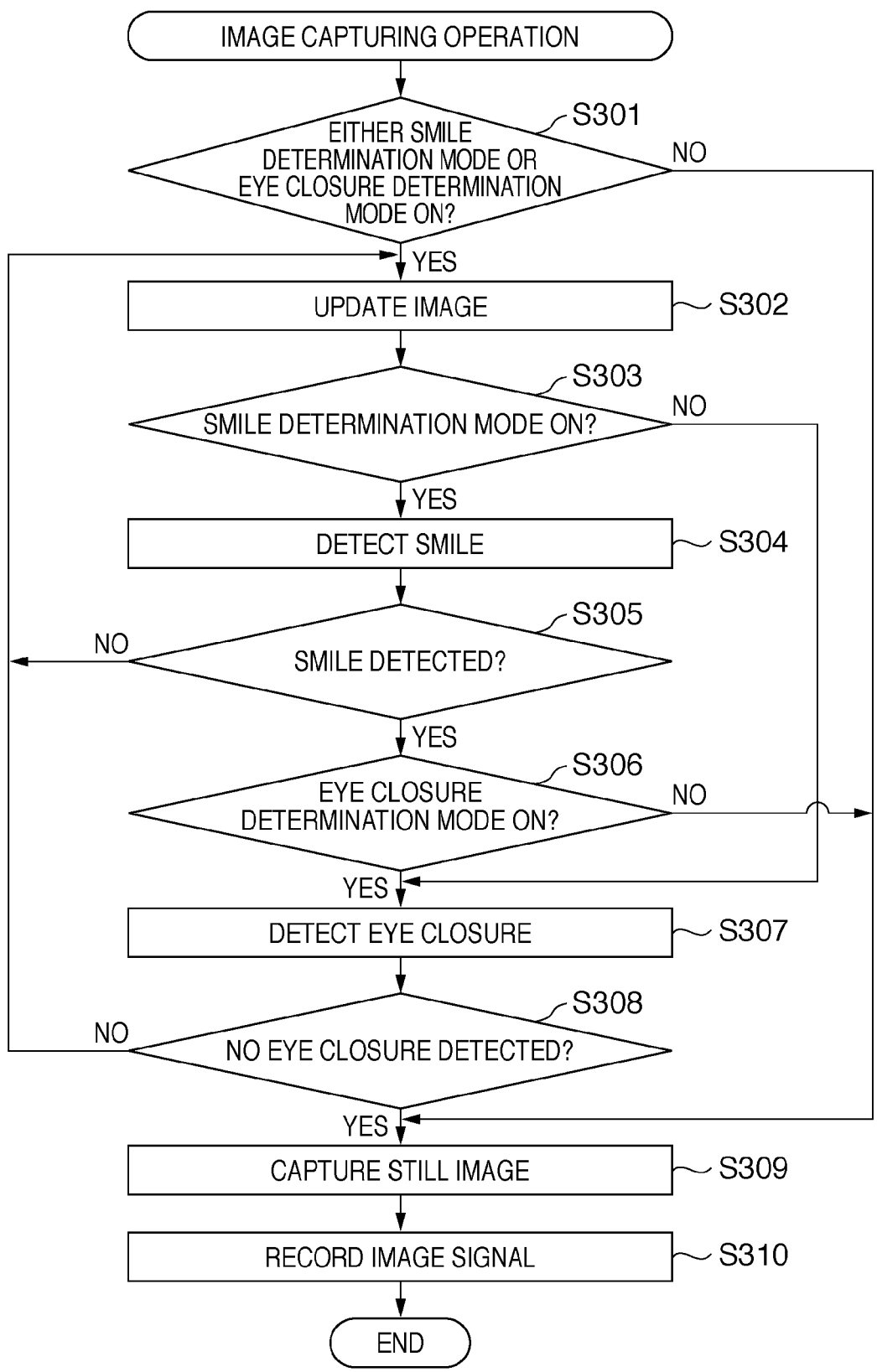
FIG. 4 is a flowchart showing the operation of the image sensing apparatus when the user presses a shutter switch in the first embodiment.

Note that the display of a warning message in the third embodiment may be applied to the sequence of FIG. 4 in the first embodiment. In this case, in the "smile+eye closure determination mode", a threshold to determine eye closure in step S205 is corrected in a direction in which the threshold makes it more difficult to meet the determination condition than a threshold in the "eye closure determination mode". This decreases the frequency of displaying a warning message to notify the user that eye closure has been determined when the object just smiles and narrows his eyes. Thus, the user is hardly annoyed with the message.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-204769, filed Aug. 7, 2008, and No. 2009-134301, filed Jun. 3, 2009, which are hereby incorporated by reference herein in their entirety.

What is claimed is:

1. An image sensing apparatus comprising:
   an image sensing unit configured to sense an object and generate image data;
   a face detection unit configured to detect a face region of a person contained in the image data generated by said image sensing unit; and
   a facial expression determination unit configured to determine a plurality of facial expressions in the face region detected by said face detection unit,
   wherein when both a first facial expression and a second facial expression are determined, said facial expression determination unit corrects a condition to determine the second facial expression so as to become difficult as compared to the determination condition when the first facial expression is not determined and the second facial expression is determined.

2. The apparatus according to claim 1, wherein when said facial expression determination unit determines that the first facial expression is contained, said image sensing unit captures an image.

3. The apparatus according to claim 1, further comprising a warning unit configured to, when an image is captured and said facial expression determination unit determines that the captured image contains the second facial expression, issue a warning based on a result of the determination.

4. The apparatus according to claim 1, wherein said facial expression determination unit includes a mode in which the first facial expression is determined, a mode in which the second facial expression is determined, and a mode in which both the first facial expression and the second facial expression are determined.

5. The apparatus according to claim 1, wherein the first facial expression is a smile and the second facial expression is eye closure.

6. The apparatus according to claim 5, wherein said facial expression determination unit makes determination based on an opening/closing degree of eyes when determining the first facial expression and also when determining the second facial expression.

7. An image capturing method in an image sensing apparatus which senses an object to generate image data, the method comprising:
   a face detection step of detecting a face region of a person contained in the generated image data;
   a facial expression determination step of determining a plurality of facial expressions in the face region detected in the face detection step; and
   a control step of controlling image capturing in accordance with a result of the determination in the facial expression determination step,
   wherein when both a first facial expression and a second facial expression are determined in the facial expression determination step, a condition to determine the second facial expression is corrected so as to become difficult as compared to the determination condition when the first facial expression is not determined and the second facial expression is determined.

8. An image processing apparatus comprising:
   a face detection unit configured to detect a face region of a person from an image data; and
   a facial expression determination unit configured to determine a plurality of facial expressions in the face region detected by said face detection unit,
   wherein when both a first facial expression and a second facial expression are determined, said facial expression determination unit corrects a condition to determine the second facial expression so as to become difficult as compared to the determination condition when the first facial expression is not determined and the second facial expression is determined.

9. The apparatus according to claim 8, wherein the first facial expression is a smile and the second facial expression is eye closure.

* * * * *